April 18, 1933.  L. WIDEMAN ET AL  1,904,910

GASKET

Filed May 11, 1929

Inventors
Louis Wideman
Arthur W. Anderson
Phineas L. Rider
By Attorneys

Patented Apr. 18, 1933

1,904,910

UNITED STATES PATENT OFFICE

LOUIS WIDEMAN, ARTHUR W. ANDERSON AND PHINEAS L. RIDER, OF WORCESTER, MASSACHUSETTS

GASKET

Application filed May 11, 1929. Serial No. 362,396.

This invention relates to strip packing for use around refrigerator doors and in connection with other doors and windows to prevent the passage of air, moisture and heat.

The principal objects of the invention are to provide a convenient strip of packing for these purposes which will remain alive and resilient after long use; to provide a packing of such material that it will not deteriorate and can be molded by a simple molding operation in a single piece; to provide it with a protecting coating all around it; and to provide it in a form which will be convenient to apply to refrigerator doors and the like.

Other objects and advantages of the invention will appear hereinafter.

Reference is to be had to the accompanying drawing, in which

Figure 1:
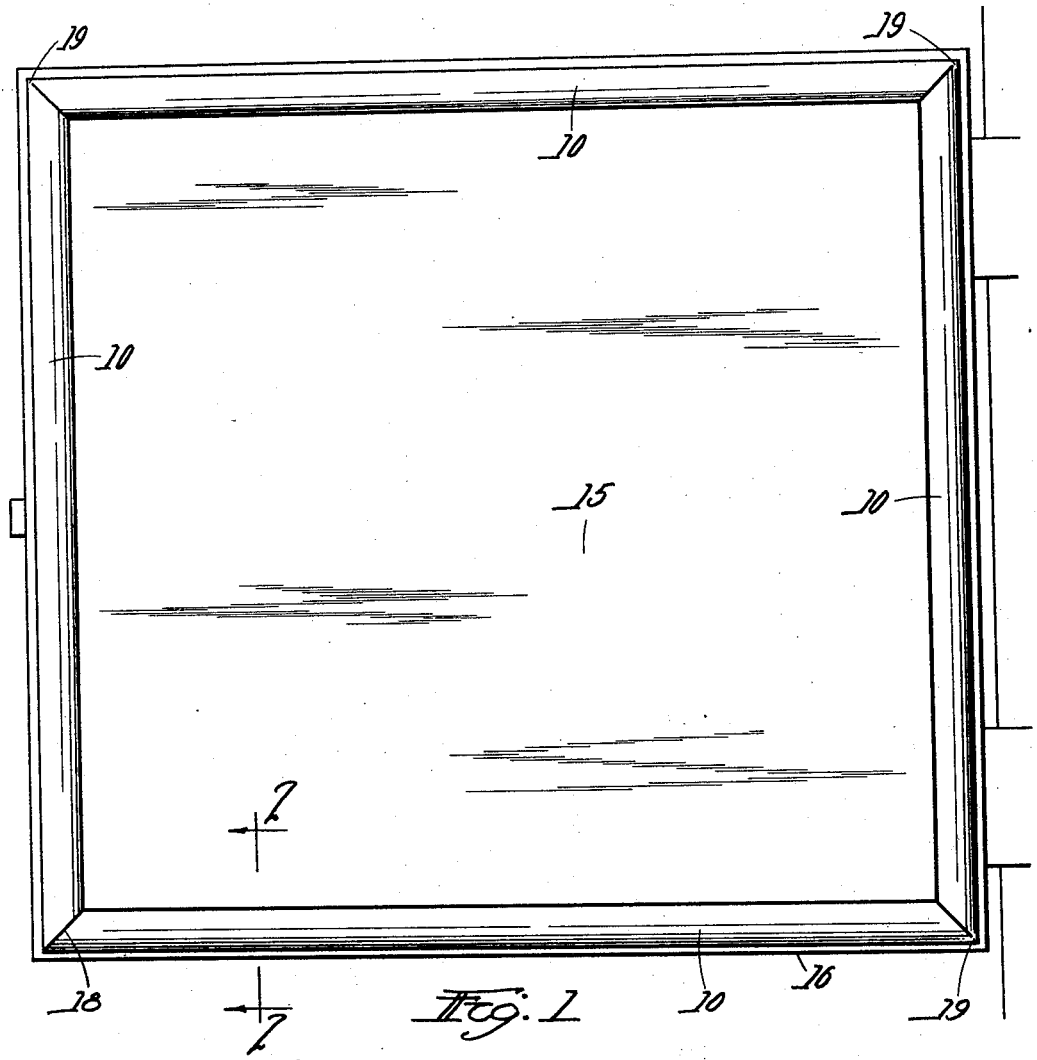
Fig. 1 is an inside view of a door provided with packing of this type and constructed in accordance with this invention.

It is well known that the subject of packing refrigerator doors is a matter that has involved considerable experiment in the last few years, owing to the fact that such packing must be heat insulating in a very high degree and to the presence of moisture. Soft rubber packings have been used and also packings of felt and similar materials, but the soft rubber packings have not been sufficiently soft and the felt packings have had a tendency to mat down and get out of shape easily, while both of them have been lacking in the quality of durability. This invention has been designed to avoid these difficulties chiefly.

We form the packing mainly of sponge rubber and prepare it in a long strip in which there is a main portion 10 of semi-circular or similar shape, and a tongue 11 projecting therefrom integrally. In its molding it preferably has a skin of rubber extending entirely around its surface. Around the entire body is a layer of rubberized fabric 12. This is a layer of thin finely woven fabric impregnated with rubber or latex, and it extends all the way around the body of the gasket so as to protect it from the entrance of moisture into the interstices in the sponge rubber. The tongue or projection 11 extends out in a radial direction and there is a flat surface under the whole width of the fabric including this projection. The fabric 12 is cemented to the sponge rubber.

When applied to an ice-box door as shown, the projection 11 is fitted into a recess or rabbet 14 in the door 15, and the flat surface of the packing is cemented by a liquid rubber cement, or otherwise secured, to the projecting surface 16 of the door.

Figure 2:
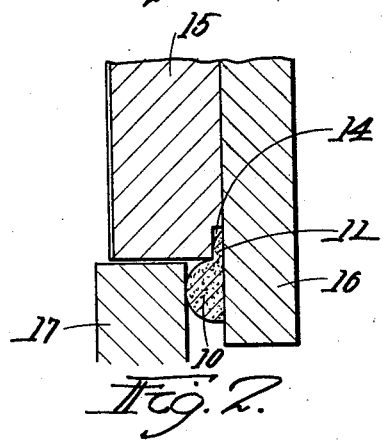
Fig. 2 is a sectional view of the same on the line 2—2 of Fig. 1.
Figure 3:
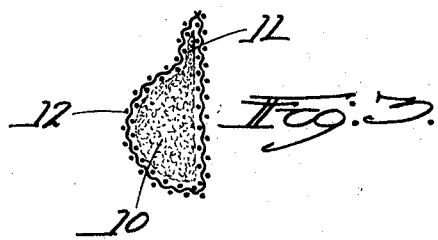
Fig. 3 is an enlarged exaggerated cross-sectional view of the packing itself.

Fig. 2 shows the door closed against the jamb 17 and it will be seen that the gasket constitutes a perfect seal against moisture around the door.

In making up a complete gasket for a door, such as shown in Fig. 1, a single length of this material is used having its ends at the point 18. This is mitered out in an opposite direction at each corner, leaving a slight amount of sponge rubber 19 and fabric 12. This permits of bending it around the square corners of the central portion 15 of the door and leaves it in the position shown in Fig. 1.

The material is not only useful for the doors of ice-boxes and electric refrigerators, but is capable of being employed as window and door stripping, and in fact in many places where a soft gasket or weather strip is required.

Although we have illustrated and described only one form of the invention, we are aware of the fact that changes can be made therein by any person skilled in the art without departing from the scope of the invention as expressed in the claims. Therefore we do not wish to be limited to the exact form shown, but what we do claim is:—

The combination with a door having a rabbet extending into the edge thereof parallel with the plane of the door and having a projection extending from one surface of the rabbet to the edge of the door, of a gasket having a semi-cylindrical part provided with a radial lip extending into the rabbet and a flat side lying against the projection, the semi-cylindrical surface being adapted to engage the door jamb.

In testimony whereof we have hereunto affixed our signatures.

LOUIS WIDEMAN.
ARTHUR W. ANDERSON.
PHINEAS L. RIDER.